No. 642,420. Patented Jan. 30, 1900.
W. D. BOWKETT.
APPLIANCE FOR SEPARATING AND DISSIPATING FROTH FROM FLUIDS.
(Application filed May 27, 1899.)
(No Model.)
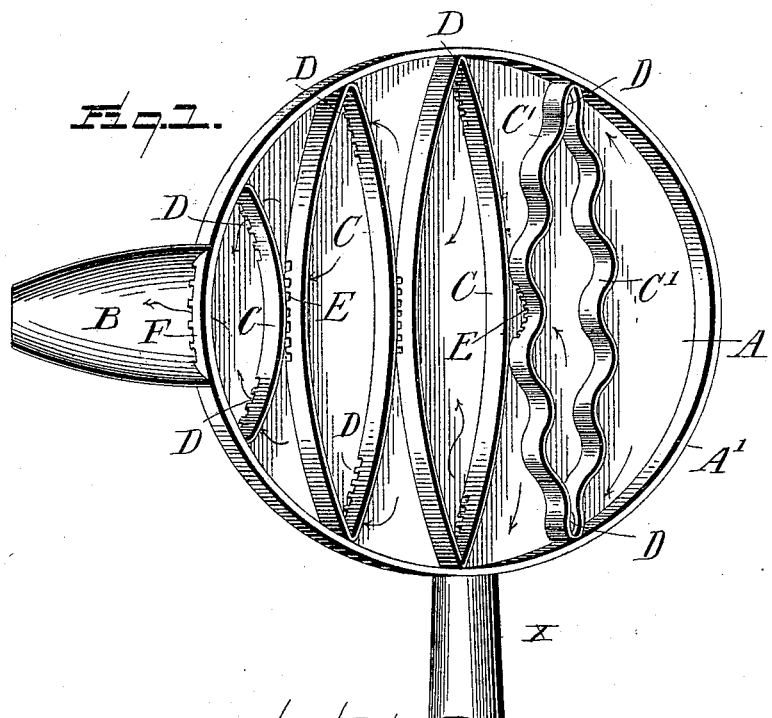
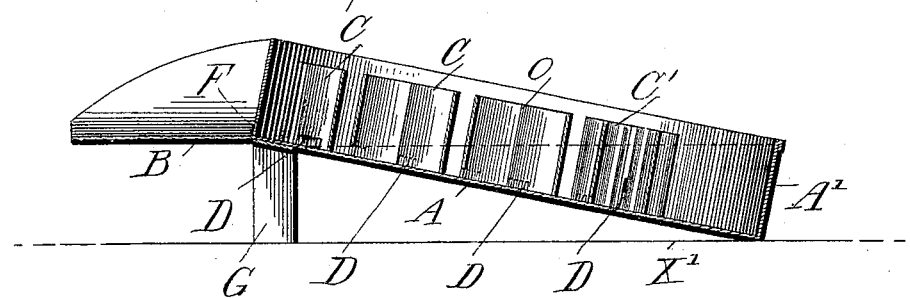
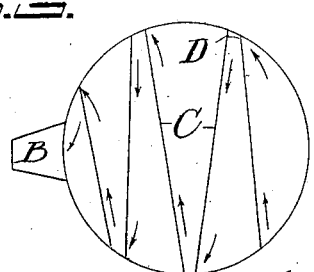
Witnesses
Inventor

UNITED STATES PATENT OFFICE.

WILLIAM D. BOWKETT, OF WINTON, QUEENSLAND.

APPLIANCE FOR SEPARATING AND DISSIPATING FROTH FROM FLUIDS.

SPECIFICATION forming part of Letters Patent No. 642,420, dated January 30, 1900.

Application filed May 27, 1899. Serial No. 718,600. (No model.)

*To all whom it may concern:*

Be it known that I, WILLIAM DAVID BOWKETT, a subject of the Queen of the United Kingdom of Great Britain and Ireland, residing at Winton, in the Colony of Queensland, have invented certain new and useful Improvements in Appliances for Separating and Dissipating Froth from Fluids; and I do hereby declare the following to be a full, clear, and exact description of the invention, such as will enable others skilled in the art to which it appertains to make and use the same.

The object of my invention is to provide an appliance which will prevent the delay, waste, and annoyance frequently caused when there is an excessive formation of froth or foam in decanting fermented and aerated liquids, such as porter, beer, ginger-beer, &c.

By my invention the escape of the gas contained in (and consequently the dissipation of) such froth is facilitated, while the fluid can be rapidly poured or run off into a tumbler or other vessel without taking an excess of froth with it.

While the above is the principal use of this invention, there may be analogous uses which when the invention is more fully understood will readily be apparent.

My invention further consists in sundry details by which my appliance is rendered convenient in use and easy of manufacture.

The objects aforesaid are attained by the provision of certain surfaces to retain the foam, combined with perforations to allow the liquid to trickle or gravitate from one surface to another in a sinuous or irregular course. This combination will be understood from the attached drawings, which represent suitable forms of my appliance, and in which—

Figure 1 represents my appliance in plan view. Fig. 2 shows a side view in central vertical section. Fig. 3 is a diagram in plan view on a small scale, showing certain parts straight which in Fig. 1 are curved.

In the drawings, A is a pan of any suitable form, with walls A' of suitable height, handle or the like X, spout B for discharge, and foot G at the spout side so arranged that the pan can be set down on the horizontal surface X', Fig. 2, and retain liquid therein, as indicated by the line Z. This pan is furnished with partitions or guide-bars, either fastened along or integral with the bottom thereof and having holes or a slit or slits of suitable size at their bases, as shown by D and E, the holes and partitions being so arranged as to cause the liquid when being poured out of the pan to traverse the sinuous, zigzag, or irregular path, as indicated by the arrows in Figs. 1 and 3. Thus the liquid will pass from the holes D, Fig. 1, at the sides of one partition to the holes E at the center of the next partition, then to the holes D at the sides of the next partition, and so on, finally escaping through holes F into the spout. It will be seen from Fig. 3 that when a pan arranged as shown is tilted the whole of the fluid will gradually run out, and the corrugation C' (shown in Fig. 1) is merely a modification intended to show that the invention is not restricted to straight partitions or to partitions formed of a single arc. The latter partitions (not corrugated) have been found to answer extremely well. The position of the holes shown is that which I have found the best; but other positions might be employed within the spirit of this invention. The rate of flow will depend upon the angle of inclination at which the appliance is held, the froth and foam forming upon the pan and partition surfaces and remaining there until it has dissipated, which it does comparatively quickly, so allowing the appliance to be kept in continuous use. Fatty substances will be retained upon the partitions when certain liquids containing them, such as soups, are poured into the pan, and in this way the soup free from fat can be conveniently insured.

What I claim, and desire to secure by Letters Patent of the United States, is—

1. In an appliance for separating and dissipating froth from liquids, the combination with the pan A having an inclined base and a wall A', of an outlet B, a foot G on the same side as the outlet, and partitions extending across the said pan, and having perforations therein, the whole so arranged as to allow liquid to drain down to the said outlet in a zigzag or sinuous path leaving the foam behind substantially as set forth.

2. In an appliance for separating and dissipating froth from liquids, the combination with a flat circular containing vessel, provided with means for supporting the same and also with perforations at one side with a spout around the same; of a series of curved partitions therein extending across said vessel, provided with perforations, for allowing the passage of fluid therethrough, substantially as described.

3. In an appliance for separating and dissipating froth from liquids, the combination with a flat circular containing vessel A provided with perforations F at one side with the spout B around the same, and a support G below said perforations; of a series of partitions extending crosswise therein provided with perforations D and E for the passage of liquid therethrough, substantially as described.

In testimony whereof I affix my signature in presence of two witnesses.

WILLIAM D. BOWKETT.

Witnesses:
G. G. TURRI,
W. H. CUBLEY.